US 8,121,966 B2

(12) United States Patent
Routray et al.

(10) Patent No.: US 8,121,966 B2
(45) Date of Patent: Feb. 21, 2012

(54) METHOD AND SYSTEM FOR AUTOMATED INTEGRATED SERVER-NETWORK-STORAGE DISASTER RECOVERY PLANNING

(75) Inventors: Ramani Ranjan Routray, San Jose, CA (US); Upendra Sharma, Gurgaon (IN); Sandeep Madhav Uttamchandani, San Jose, CA (US); Akshat Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 844 days.

(21) Appl. No.: 12/134,152

(22) Filed: Jun. 5, 2008

(65) Prior Publication Data

US 2009/0307166 A1 Dec. 10, 2009

(51) Int. Cl.
*G06F 17/00* (2006.01)
*G06N 5/02* (2006.01)
(52) U.S. Cl. ........................................ 706/46
(58) Field of Classification Search ............... 706/46
See application file for complete search history.

(56) References Cited

U.S. PATENT DOCUMENTS

| | | | |
|---|---|---|---|
| 6,226,627 B1 | 5/2001 | Polak | |
| 6,266,784 B1 | 7/2001 | Hsiao et al. | |
| 2005/0283504 A1 | 12/2005 | Suzuki et al. | |
| 2006/0259526 A1 | 7/2006 | Booz et al. | |
| 2007/0078982 A1 | 4/2007 | Aidun et al. | |

OTHER PUBLICATIONS

Components and Analysis of Disaster Tolerant Computing, Lawler, C.M.; Harper, M.A.; Thornton, M.A.; Performance, Computing, and Communications Conference, 2007. IPCCC 2007. IEEE Internationa Digital Object Identifier: 10.1109/PCCC.2007.358917 Publication Year: 2007, pp. 380-386.*
Kun Wang, et al., A Mathematical Approach to Disaster Recovery Planning, Proc. of the First International Conference on Semantics, Knowledge, and Grid (SKG 2005), pp. 46-48.
Klara Nelson, Examining Factors Assocated with IT Disaster Preparedness, Proceedings of the 39th Hawaii International Conference on System Sciences, Jan. 2006, 10 pgs. vol. 8.
Lawler C.M., et al., Components and Analysis of Disaster Tolerant Computing, Performance, Computing, and Communications Conf., Apr. 2007, pp. 380-386.

* cited by examiner

*Primary Examiner* — Michael B Holmes
(74) *Attorney, Agent, or Firm* — Kenneth L. Sherman, Esq.; Michael Zarrabian, Esq.; Myers Andras Sherman & Zarrabian LLP

(57) ABSTRACT

An automated disaster recovery (DR) planning system for a computing environment is provided. A discovery module discovers servers, networks, and storage devices in a computing environment. An expert knowledge base module captures best practices in planning, and capabilities, interoperability, limitation and boundary values for different DR technologies. A match-making module determines multiple DR plans as combinations of one or more replication technologies that can be used to satisfy DR requirements. And, an optimizer configured for assessing a feasible DR plan from said multiple DR plans, to deploy for DR planning of a primary computing environment.

20 Claims, 8 Drawing Sheets

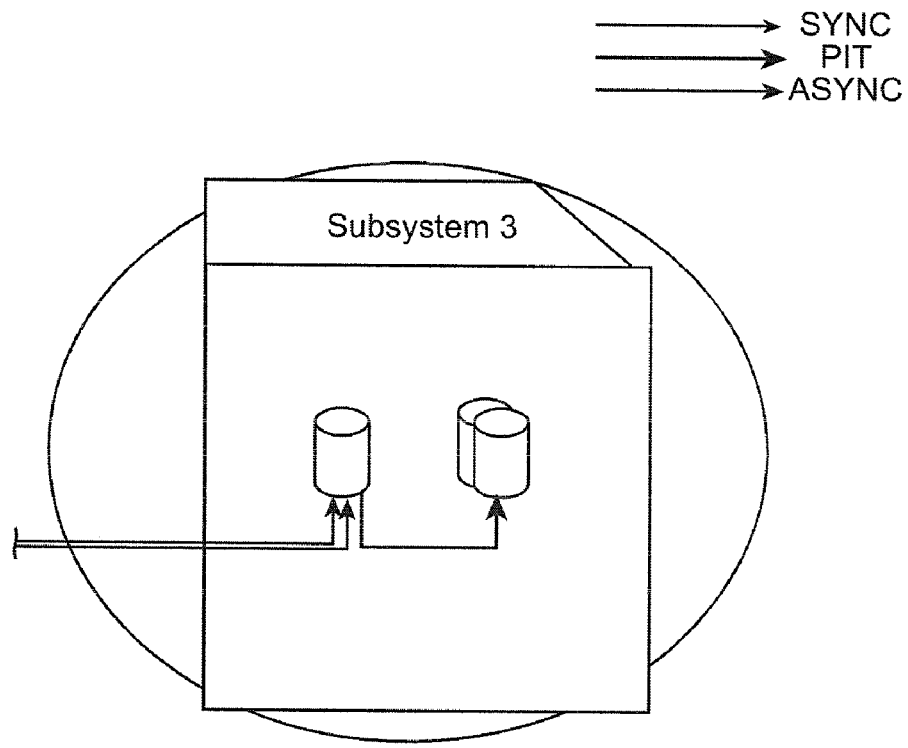

→ SYNC
⇒ PIT
→ ASYNC

Copy 1
- LSS failure
  - RTO = 10 mins
  - RPO = 10 mins
- Subsystem failure
  - RTO = 10 mins
  - RPO = 10 mins
- Link Failure
  - RTO = 10 mins
  - RPO = 10 mins
- Site Failure
  - RTO = 10 mins
  - RPO = 10 mins
  - Distance=300
- Virus failure
  - RTO = 5 mins
  - RPO = 1 hour Copy 3
- LSS failure = No
- Subsystem failure = NO
- Link Failure = NO
- Site Failure = NO
- Virus failure
  - RTO = 5 mins
  - RPO = 1 hour
- Consistent data=no
- Site = 2

Copy 4
- LSS failure = No
- Subsystem failure = NO
- Link Failure = NO
- Site Failure = NO
- Virus failure = No
- Consistent data = No
- Site = 2

METHOD AND SYSTEM FOR AUTOMATED INTEGRATED SERVER-NETWORK-STORAGE DISASTER RECOVERY PLANNING

BACKGROUND OF THE INVENTION

1. Field of the Invention

The present invention relates generally to disaster recovery planning in computing systems and in particular to automate planning for end-to-end disaster recovery of enterprise applications.

2. Background Information

In computer processing systems, application downtime results in financial losses for enterprises. While disaster recovery (DR) planning is one of the most critical tasks for administrators managing storage, databases, servers, virtual machines, it is the least automated and a fairly uncoordinated process, relying on error prone and suboptimal techniques. DR planning at individual layers such as storage does not take into account overlapping replication functionality of other layers such as databases and virtual machines. For example, synchronous replication at the storage controller level can be replaced by database-level synchronous replication which provides an additional benefit of transaction integrity at the expense of a significantly higher network bandwidth overhead.

Also, within a particular layer, the selection of the replication technology is dependent on its operational details, cost, interoperability requirements, and existing infrastructure. Finally, the opportunity to satisfy composite requirements by combining technologies of individual layers is not available.

End-to-end DR planning is a complex manual process today involving a highly skilled group of application, database, storage administrators or consultants. A typical real-world DR deployment is a combination of technologies at the server-level, network-level and storage-level. For example, a common configuration is server-level replication combined with synchronous data replication in a database combined with asynchronous inter-site data replication in the enterprise class storage controllers.

SUMMARY OF THE INVENTION

A method and system for integrated automated server-network-storage disaster recovery (DR) planning is disclosed. An embodiment involves automating planning for end-to-end disaster recovery of enterprise applications, leveraging available replication technologies at different levels namely server-level, storage-level, and network-level. According to one implementation, a method for DR planning in a computing environment includes providing a DR planning framework, and performing a hybrid heuristic-analytic optimization process in the framework to generate one or more replication configuration plans. These plans contain details of replication technologies to be used across all the computing entities (namely servers, networks, and storage) related with an application in its primary computing environment. Performing a hybrid heuristic-analytic optimization process may further include performing a multi-level optimization process based on a combination of analytic models and best-practice heuristics for deriving an integrated DR plan.

In another embodiment, the invention further provides disaster recovery (DR) planning within a single layer of the computing environment. A disaster planning framework can be used to find the best replication technology within a single layer (storage, server or network) of the computing infrastructure. An expert knowledge base module captures best practices in planning, cataloging of available technologies along with their capabilities, interoperability constraints, limitation and boundary values for different DR technologies. The planning framework generates one or more choices of technologies within the layer that can be used to satisfy the high-level DR requirements specified by the user. For example, in response to a high-level requirement of site-level protection for storage, the planning framework explores all the single and cascaded replication configurations and presents a ranked list of these options to the administrator.

In another embodiment, the invention further provides a disaster recovery (DR) planning system for a computing environment, is provided. A discovery module discovers servers, networks, and storage devices in a computing environment. An expert knowledge base module captures best practices in planning, and capabilities, interoperability, limitation and boundary values for different DR technologies. A matchmaking module determines multiple DR plans as combinations of one or more replication technologies that can be used to satisfy DR requirements. And, an optimizer configured for assessing a feasible DR plan from said multiple DR plans, to deploy for DR planning of a primary computing environment.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

Figure 1:
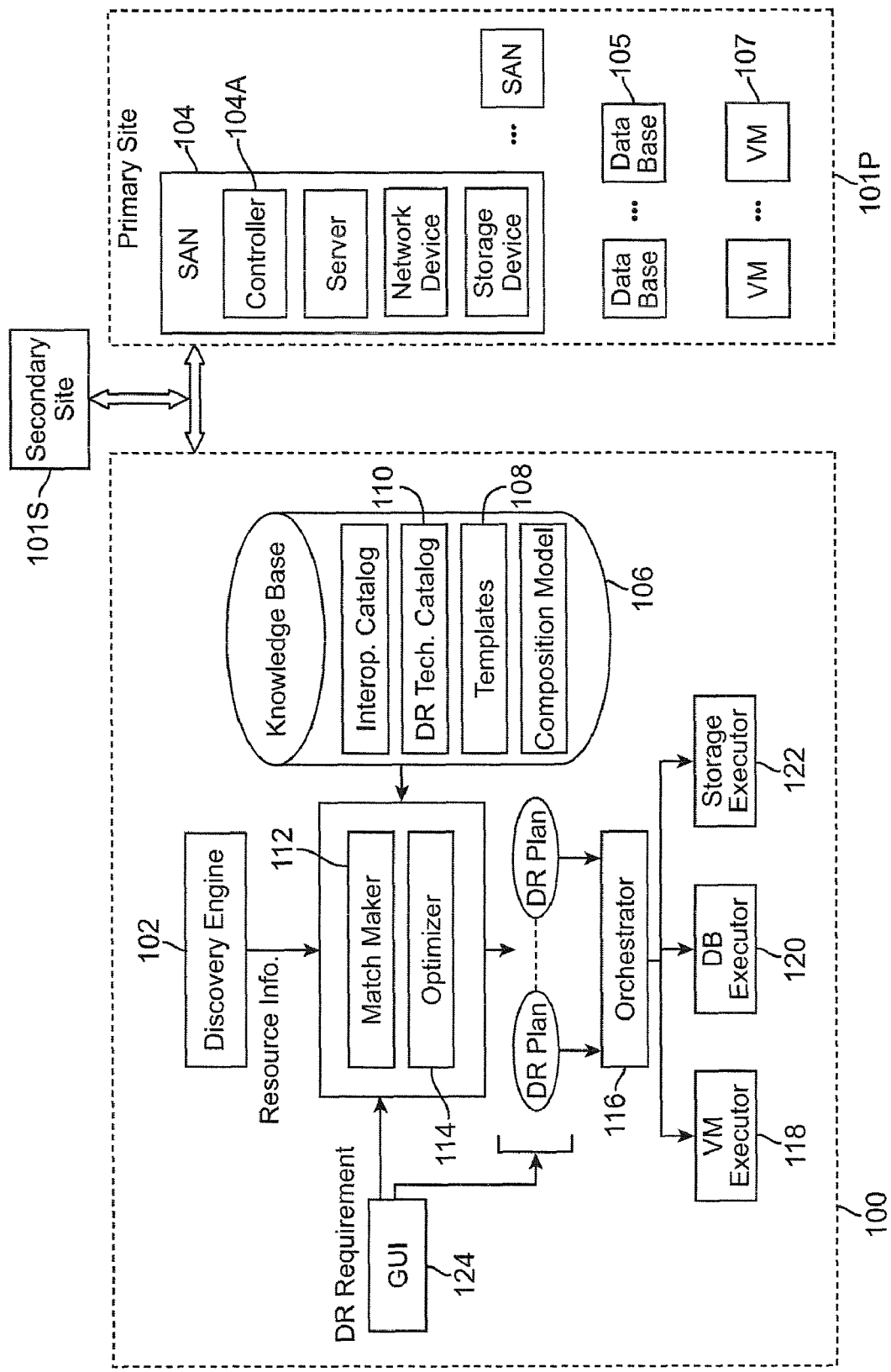
FIG. 1 shows a functional block diagram of a DR planner system, according to an embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments of disaster recovery (DR) planning systems, as well as operation and/or component parts thereof. While the following description will be described in terms of a data storage system for clarity and to place the invention in context, it should be kept in mind that the teachings herein may have broad application to all types of data safe keeping and recovery systems.

The embodiments described below disclose a new system for integrated server-network-storage disaster recovery (DR) planning. According to one general embodiment, the system includes an integrated server-network-storage DR planning framework using a hybrid heuristic-analytic optimization process. Such DR planning provides high availability of system resources and data recovery capabilities. In one embodiment, end-to-end planning involves DR planning for multiple tiers including: storage systems, databases (DBs), and virtual machines (VMs).

In another embodiment, the invention further provides a disaster recovery (DR) planning within a single layer of the computing environment. A disaster planning framework can be used to find the best replication technology within a single layer (storage, server or network) of the computing infrastructure. An expert knowledge base module captures best practices in planning, cataloging of available technologies along with their capabilities, interoperability constraints, limitation and boundary values for different DR technologies. The planning framework generates one or more choices of technologies within the layer that can be used to satisfy the high-level DR requirements specified by the user. For example, in response to a high-level requirement of site-level protection for storage, the planning framework explores all the single and cascaded replication configurations and presents a ranked list of these options to the administrator.

In another embodiment, the invention provides a disaster recovery (DR) planning system to an information technology (IT) consultant who is responsible for providing resiliency configuration options to the customer. The consultant inputs the details of the customer's computing environment either manually or if the customer already had computing configuration data in a standardized format (such as SMI-S), the data is imported in the planning framework. The knowledge base of the planner is extensible and allows including any subset of technologies from one or more vendors.

In another embodiment, the invention allows administrators to use the framework to make sure that the resiliency deployments across the enterprise's multiple data-centers (possibly geographically distributed) meet configuration standards/rules established by the enterprise. One example of these standards is "an application of type X is provided resiliency by using a specific replication configuration." The planning framework allows for deriving plans using a combination of heuristics and analytical optimization.

In another embodiment, the invention allows administrators and consultants to generate a "bill-of-items" for the computing hardware, software and licenses that will be required to setup a replication configuration to meet the resiliency requirements specified to the planning framework.

In the following, DR planning terminologies are first provided, and then DR planning according to the present invention is described. DR requirements are specified for a data source which includes a logical entity that may comprise an application, database or file system that need protection against disasters. RPO is the Recovery Point Objective in seconds or minutes, corresponding to the loss of updates the user is willing to tolerate in the event of a failure (indicating how quickly the updates are propagated from the primary to the secondary data sources). RTO is the Recovery Time Objective in seconds or minutes, corresponding to the system downtime (online portals such as eBay or Amazon, have RTOs of less than a minute). Failover refers to the recovery after a failure, switching from a primary copy to a secondary copy of data. Users may also specify their preference for a particular type of device or technology as part of the input. Additionally, they can specify an objective function such as select DR plans to minimize cost, minimize hardware requirements, etc.

DR requirements are specified using DR Profiles. A data source can have one or more DR profiles defined. A schema of a DR profile comprises a DR Profile protection categories (P-category), RTO, RPO, Application Impact (corresponding to the added latency, in milliseconds, to the application due to data replication), Distance (corresponding to how far the target site should be located), and Consistency Group. The P-category represents the type of protection including site failure, subsystem failure, virus or mis-configuration failure, etc.

The administrator may specify their preference for a particular type of device or technology as part of the input. Typically, an application may have multiple associated data sources that need to be consistently replicated together as a group, referred to as a consistency group. There are several replication technologies with similar functionality available from different vendors. For example, synchronous data replication at the storage level can be accomplished using IBM PPRC, EMC SRDF, HP Continuous Copy. In this description, functionality such as synchronous data replication is as Replication Technology Class (TC), while instances from different vendors are referred to as Replication Technology Instance (TI).

Server failover technologies include server clustering solutions (e.g., Veritas Cluster Solution, IBM HACMP) that use a heartbeat mechanism to migrate applications from a failing node to a healthy node. Server virtualization technologies include, e.g., VMWare, Xen, Microsoft Virtual Server. Server virtualization allows running multiple applications (with potentially conflicting operating system requirements) on a single physical machine by isolating applications and their operating systems into independent virtual machines.

From an application perspective, since a virtual machine resembles a physical machine, application DR and backup can continue to function as usual. Virtualization platforms also offer their own High Availability (HA) technologies (e.g., VMWare HA) that migrate a VM from a failing node to a healthy node. VM backup technologies such as, VMWare VM Snapshot technology, capture the entire state of the virtual machine at the time of the snapshot, including the state of all the virtual machine disks, the contents of the virtual machine memory and the virtual machine settings. By reverting to an existing snapshot, an application can return to the exact same state as during the time of the snapshot. This provides RTO advantages as the application does not require restarting after a failure. Additionally, this technology is useful to protect against accidental VM deletions. The VM snapshot produces only a "crash-consistent" image of the VM. For applications that have higher consistency requirements, for example, transactional integrity for database applications, snapshot needs to be integrated and synchronized with other DR technologies. As an example, combining VM snapshot with DB2 quiescing mechanisms (write-suspend and crash-recovery), transactional integrity can also be achieved. VMWare Consolidated Backup provides a framework for performing such application disaster recovery. However, it requires integration with storage replication technologies to account for storage failures and site failures.

Database Replication can have three forms: (1) replicating logs (or SQL commands) between compatible hosts, (2) using Capture/Apply protocol where DBMS can update a secondary copy in an asynchronous fashion, (3) IBM DB2 HADR and Oracle DataGuard RAC database can be replicated in synchronous/asynchronous/near-synchronous fashion with an added application impact. Database technologies also provide primitives to interplay with controller technologies.

Write-suspend allows a database (DB) to hold onto the logs in memory without flushing them onto disk. This helps the controller to make a quick action-consistent copy of the data without any application hold up. Copies created by controllers during the write-suspend can be used in crash recovery or roll-forward mode based on the requirement. Storage replication technologies can be classified synchronous, asynchronous or flash copy (point-in-time). Synchronous replication ensures that each write to disk is immediately copied to the secondary site. This ensures zero data loss in the event of a failure (zero RPO), but at the cost of high application impact. Synchronous replication is useful for mission-critical applications with limited distance between the primary and secondary sites. With asynchronous replication, write completions are returned to the application once they have been committed to the primary disk. Updates on the secondary volume are performed at a later point in time. This is useful for long distance replication, but the RPO and RTO may be significant. Depending on when the updates are performed asynchronously, one can save updates using write coalescing (such asynchronous replication techniques are called smart asynchronous replication). Point-in-time replication provides an instantaneous copy of a storage volume with minimum impact on the application. However, it may have a much worse RPO as the snapshot loses consistency with the current data at the primary site. It is useful for preserving the point-in-time images at different time instants.

FIG. 1 shows a functional block diagram of an integrated DR planner system 100, according to an embodiment of the invention, providing end-to-end planning involves DR planning for multiple tiers (levels) in a primary computing site 101P including: one or more storage systems 104, one or more databases (DBs) 105, and one or more virtual machines (VMs) 107. The functions of the system 100 include replicating information from the primary computing site 101P to a secondary computing site 101S, for providing high availability of system resources and data recovery capabilities. The system performs three overall functions: (a) bootstrapping and user input collection, (b) DR plan assessment and generation, and (c) DR plan deployment.

Bootstrapping

The bootstrapping phase includes capturing expert information in terms of capabilities of replication technologies, interoperability constraints, and best practices for plan generation. This information is specified by experts and persists across multiple planning sessions. For each planning session, the system collects user information about the existing infrastructure and the DR requirements of applications and data sources. The bootstrapping input is used to populate an expert knowledge base. In the planner 100, a discovery engine module 102 implements a discovery process to find the servers, networks, and storage devices present within a storage area network (SAN) 104 of an information technology infrastructure (IT). The discovery process gathers both static device configuration and interconnectivity data, and dynamic performance statistics and event logs. Additionally, the discovery process collects configuration information about databases and other installed software. The discovery process may be automated by such management modules as IBM TPC, HP Insight Manager, EMC Control Center, which also monitor the IT infrastructure. An open source management framework such as Eclipse Aperi may also be used for discovery.

An expert knowledge base 106 captures the best practices to be followed in planning, and captures capabilities, interoperability, limitation and boundary values for different DR technologies. The knowledge base 106 is created by consolidating the knowledge from popular deployments and others such as IBM DR experts, and IGS deployment practitioners. The knowledge base 106 is implemented as a set of DB2 tables, and separation of expert knowledge from the actual planning process provides extensibility (e.g., new replication technologies and best practices can be added to the knowledge base 106, requiring no change in the system code base).

Templates 108 include best-practices templates which are defined by administrators to express well-known replication technology configurations for providing a certain application-level DR requirement. The templates have guidelines for the mapping DR Profile protection categories (P-category) to Technology Classes (TC). The Best Practice Templates capture the inherent knowledge that a DR expert uses while designing a Disaster Recovery Plan. A template is a logical layout of copies and replicas that meet one or more Disaster Recovery objectives (DR Profiles). The templates may be obtained from case studies and red books and capture solution templates that have been deployed in practice and known to work.

A DR technology catalog 110 defines canonical models for the available replication technologies that operate at virtual machine (VM), database (DB), and storage controller levels. For each replication technology, the catalog 110 defines the technology class, DR specifications (Recovery Point Objective (RPO), Recovery Time Objective (RTO), average application latency impact, etc.), resource usage models (in terms of CPU, IO, and network as a function of the load characteristics), and protocol taxonomy (in terms of fault-coverage, copy divergence, propagation order, acknowledgment).

Match-making

A match-making module 112 functions to find combinations of one or more replication technologies that can be used to satisfy DR requirements specified by an administrator. The match-making module 112 finds options (solutions) using the best-practice templates 108 as well as composition of replication technologies from the catalog 110. The solutions comprise DR plans.

DR Deployment

An optimizer 114 assesses a solution among the feasible solutions (DR plans) that can be deployed. The optimizer uses the following information in determining such a feasible solution: (1) DR plans generated by the match-maker 112 for one or more enterprise applications, (2) the RPO, RTO, and resource usage properties of each DR plan, (3) the available resource usage which includes the CPU utilization of the servers, available bandwidth at the storage controllers, interconnecting bandwidth between servers and storage controllers as well as between storage controller pairs, historic load pattern on the servers, network and storage, runtime system event log, and (4) administrator-defined priorities and objective metrics such as, cost, application latency impact, and homogeneity of replication technologies.

A runtime orchestrator 116 synchronizes technology levels such as at a VM executor 118, a database executor 120, and a storage executor 122, during normal operation (e.g., a storage flash copy may need to be synchronized with a freeze of operations at the database level), as well as during failover (e.g., to restart the application, first restart storage, then VM, followed by database).

A replication technologies catalog 110 is used to identify candidate replication technologies that would meet any given DR Profile. The replication technologies catalog captures information about: (1) storage controllers and their characteristics (capacity, throughput), (2) servers and their specifications, information about supported replication technologies (controller or host based) and their capabilities (RTO, RPO, Application Impact), (3) automation technologies for application failover, (4) interoperability of replication technologies with each other, (5) interoperability of replication technologies with automation technologies, (6) interoperability of storage controllers, and (7) information on limitations of servers, storage controllers, replication and automation technologies.

For the planner 100 to be extensible, the replication technologies and resources, namely storage-controllers, servers, operating-systems, are modeled using a common schema and represented as said knowledge base. This ensures that addition or modification of replication technologies does not affect integrated DR planning code itself, and requires changes only in the knowledge base. The replication catalog has e.g., a set of more than 30 tables that capture a large number of intricate details of the DR technologies, a few examples of which tables are described below. The most important tables in the replication catalog are T_CAT_CONT_REPLICATION and T_CAT_HOST_REPLICATION that list out the controller and host-based replication technologies along with their capabilities. The properties of storage controllers 104A are listed in a T_CAT_STORAGE_SYSTEM table. Many replication technologies have the restriction of the form that a volume that is part of (source or target) a specific replication relationship may not be allowed to become a part of some other replication technology (e.g., IBM Global Mirror target cannot become a Metro Mirror source). Restrictions such as these are captured in a T_CAT_SRC2TRGT table. Further, the storage controllers that interoperate with each other (in terms of participating in a replication relationship) are captured in a T_CAT_INTEROPERABILITY table. Server automation technologies are listed in a T_CAT_AUTOMATION table and replication technologies that interoperate with automation technologies are captured in a T_CAT_AUTOMATION_OVER_REP table.

Planner Input

Figure 2:
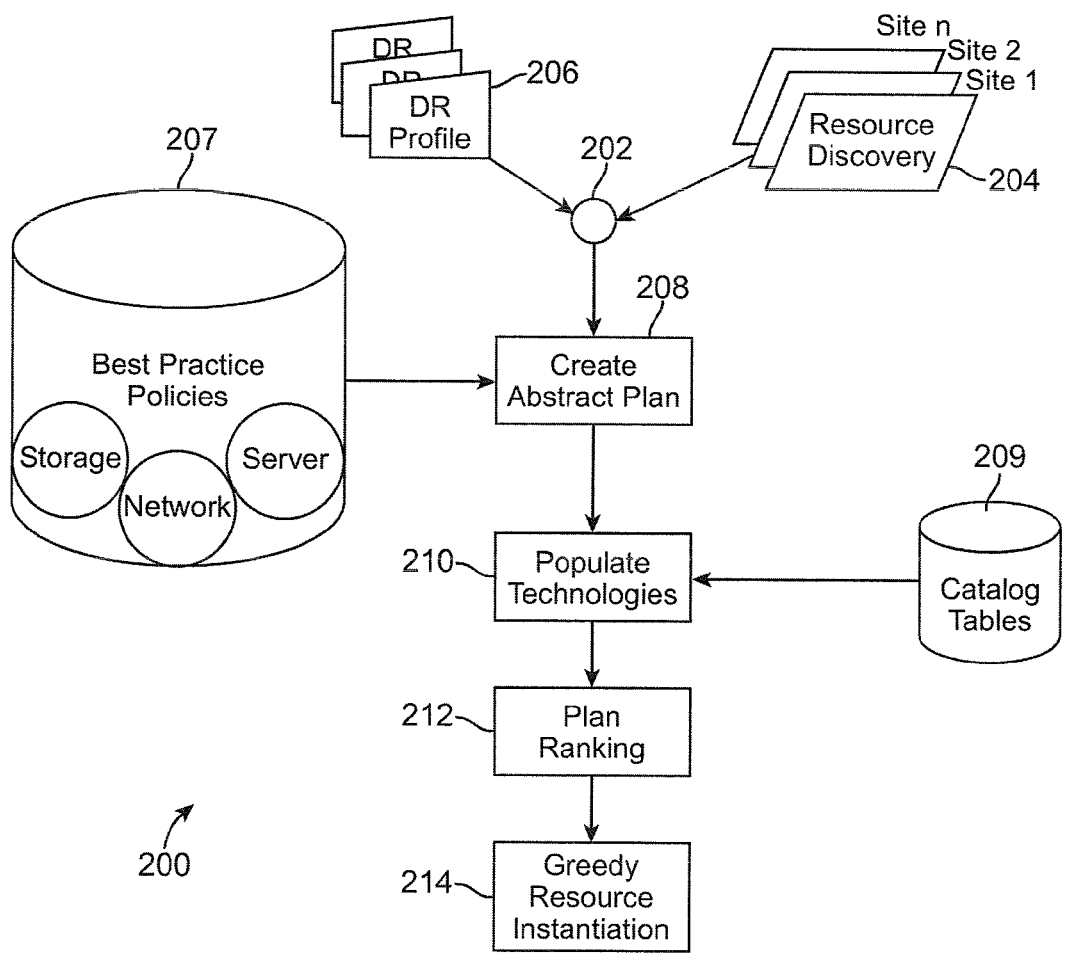
FIG. 2 illustrates a function block diagram of a DR planner process, according to an embodiment of the invention.

FIG. 2 illustrates an example DR planning function 200 implemented by the planner 100. Block 202 collects input from the site administrator for a planning session. The input includes: (1) information about IT infrastructure resources 204 (hardware, software, applications, data sources and application to data linkages) and (2) DR requirement profile(s) 206 of applications and data sources (in terms of data profiles). All the input collected (both via a GUI 124 and the automated discovery 102) is stored in the form of an input Planner Store. Abstract plan creation block 208 implements the match-making phase for exploring the solution space for all the possible replication technologies that can be used to satisfy the DR requirements.

A populate technologies block 210 implements a bootstrapping phase which includes capturing expert information in terms of capabilities of replication technologies, interoperability constraints, and best practices for plan generation. A plan ranking block 212 implements ordering the solutions for each data source based on the value of the objective function. A greedy resource instantiation block 214 performs resource instantiation strategy.

Infrastructure Discovery

In this example, Aperi Storage Management is used in the discovery engine 102 for discovering, monitoring and configuring the infrastructure devices. The Aperi Storage Management project is an open source storage management framework that provides a Storage Resource Management (SRM) suite for managing large and heterogeneous storage environments. Solutions such as EMC Control Center and HP AppIQ are products that provide similar functionality. The functionality in Aperi is divided into two layers: the base layer includes functions such as discovery, configuration, monitoring and reporting. Discovered data contains information about Servers, HBAs, Fabrics, Fiber Channel Switches, Storage Subsystems, Tape Libraries, NAS Boxes and their connectivity. Configuration deals with providing uniform primitives to change configuration of variety of systems. Monitoring functions perform monitoring the system state, updating centralized repository information and event handling. Reporting component handles visualization and reporting.

On top of said base layer, Aperi provides an advanced analytic layer that offers applications such as planner, configuration analysis, problem determination, impact analysis and change tracking. This advanced Planner layer of Aperi is used to enable planning and deployment of disaster recovery solutions for business resiliency. Such SRM platform allows leveraging the Resource Discovery Engine of Aperi. Aperi Discovery is used to collect information on all the hardware and software components deployed on each site (e.g., Site 1, Site 2, . . . , Site n, as shown in FIG. 2). Aperi uses a topology of file system, database, database attributes (data, log, temporary space), tablespace, mapping of tablespace to a file system or to a volume on a storage subsystem. However, Aperi Discovery does not support application to data linkages. Hence, to enable Aperi to capture a complete hardware and software stack of the deployed applications, an embodiment of the invention herein provides an additional layer in the discovery engine 102 on top of the Aperi discovery engine.

Aperi implementations discover the fiber channel connectivity between devices. The discovery engine 102 according to the invention adds a layer for discovery information regarding the Internet Protocol (IP) connectivity between various entities, routers, switches. This information is correlated and persisted in an Aperi database.

DR Profiles

A DR requirement profile 206 can be associated at different levels in an end-to-end stack, such as at the application-level, data container-level, or at the storage volumes. Each DR profile 206 defines a protection level such as site failure, subsystem failure, or virus or mis-configuration failure. Thus, one or more DR profiles 206 can be associated to the end-to-end stack corresponding to the required protection levels. The schema of an example DR profile 206 may include parameters:

RTO: Corresponding to the length of time a user may be willing to wait until the system is available. For online portals such as eBay or Amazon, the RTO is typically less than 1 minute.

RPO: Corresponding to the loss of updates the user is willing to tolerate. After a failure, the transactions are rolled-back to obtain a consistent application state (typically performed at the application-level or the database, with manual intervention).

Application Impact: Corresponding to the added latency (in milliseconds) to the application due to data replication.

Distance: Corresponding to how far the target site should be located.

Consistency Group: Corresponding to the data containers that need to be replicated together such that the order of updates is maintained between the different data containers.

Preferences: Corresponding to how users may specify their preference for a particular type of device or technology as part of the input. Additionally, users can specify an objective function such as select DR plans to minimize cost, minimize hardware requirements, etc.

Templates

Figure 3A:
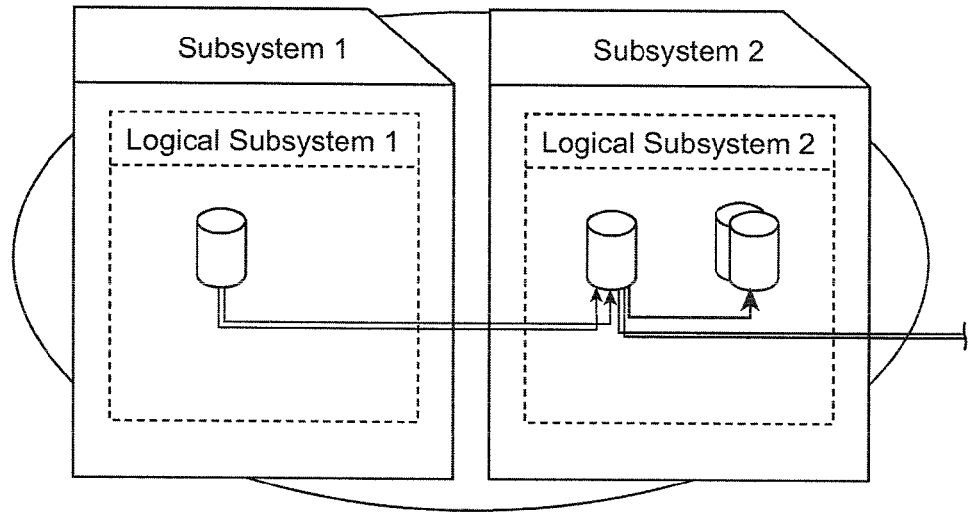
FIG. 3A shows an example template for a computing site, subsystem and virus protection, according to the invention.

A template block 207 (such as template 108 in FIG. 1), provides best practice policies. As shown by example in FIG. 3A, a sample template 207 may include two parts: (i) a set of DR capabilities 207A that the template provides, and (ii) a set of copies 207B and their relationships that define the template. In the example template 207, the DR capabilities 207A include protection to the source data for five failure types: LSS Failure, Subsystem Failure, Link Failure, Site Failure and Virus Failure. Protection can also be provided for the secondary copy of the same set of failures. The template 207 also indicates the DR service class for each failure type for all the copies. The physical definition of the template indicates that copy 1 is a synchronous copy of the source data and copy 3 is an asynchronous copy of copy 1. Similarly, copy 2 and copy 4 are point-in-time snapshots of copy 1 and copy 3, respectively.

PlannerStore

Figure 3B:
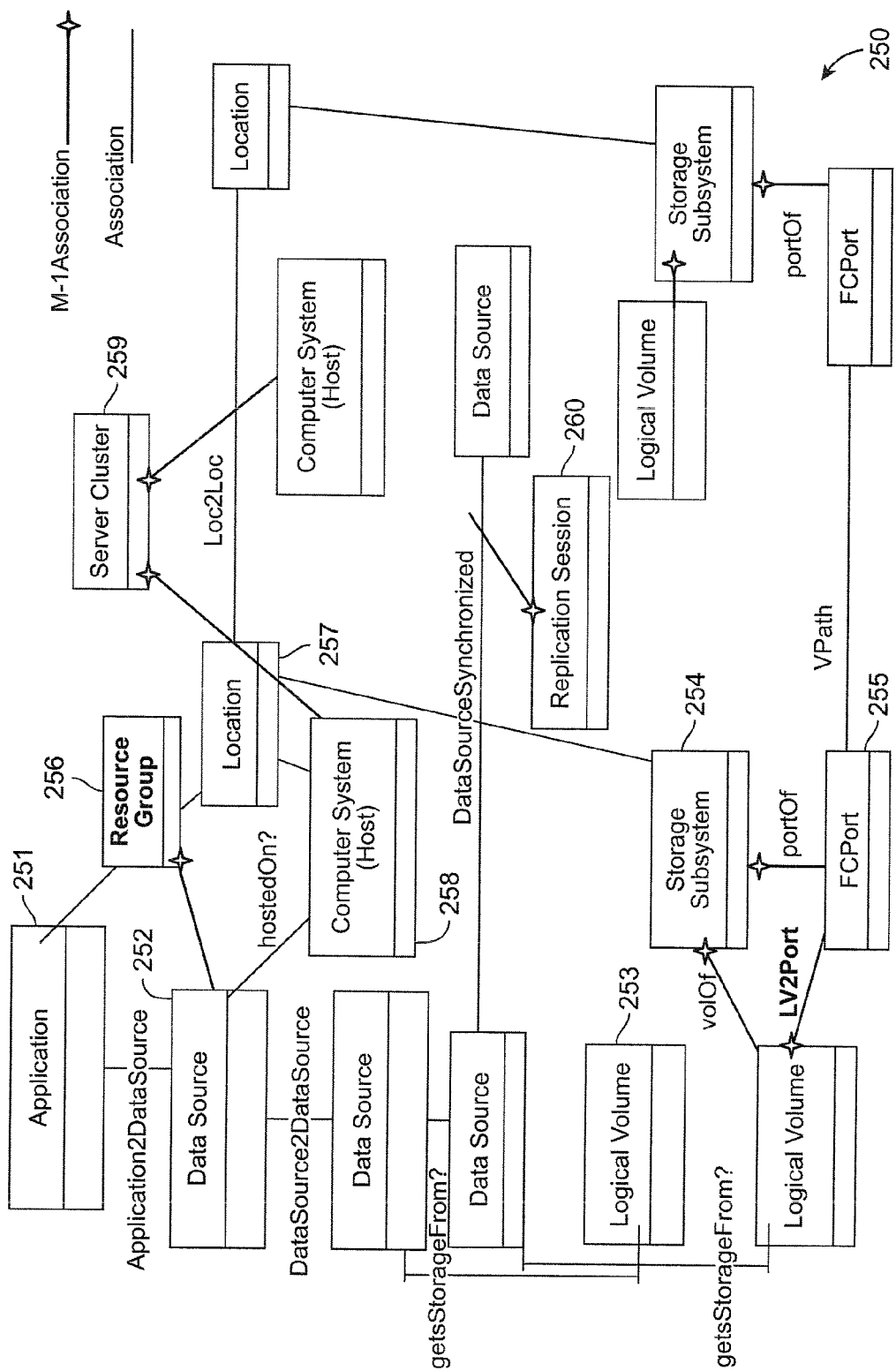
FIG. 3B shows an example planner store, according to the invention.

The CR planning process is centered on a resource graph data structure, termed the PlannerStore 250 in FIG. 3B. The PlannerStore 250 includes application 251, data sources 252, logical volumes 253, storage subsystem 254, FCPort 255, resource group 256, location information 257, computer systems (hosts) 258, server cluster 259 and replication session 260. The definitions of PlannerStore entities may use Meta Object Facility (MOF) and the structure can be persisted in one of the following three example ways: (a) in-memory cascaded hash table, (b) database, (c) hybrid (i.e., persisted in database and loaded part by part on demand into in-memory). The PlannerStore provides a common conduit understood by all the planner components as well as any external plan deployment mechanism (Plan deployers). Hence, the PlannerStore is based on the standard common information model (CIM) for compatibility with CIM-based discovery agents as well as Plan deployers. In one example the PlannerStore is structured as a hash table that is used to describe: (a) the discovered storage resources, (b) the user input, and (c) the plan elements.

Depending on the planning stage, the PlannerStore may be basic (with only storage infrastructure) or completely specified (with a complete DR plan). Each planner component may operate on the PlannerStore, enrich it with one or more plan elements, and pass it on to the next planner component.

Initially in the planning process, an input PlannerStore is created from user input and the discovered IT infrastructure. The integrated DR planner framework 100 (FIG. 1) then clones and modifies the input PlannerStore to generate one or more output PlannerStore units. Using a CIM compliant PlannerStore is beneficial in the following ways:

(a) The planner can be plugged into any CIM compliant SRM suites seamlessly.
(b) A SRM suite that is not CIM compliant can also be plugged into the planner by providing a translation layer that can transform database schema of SRM suite into PlannerStore MOF.
(c) Deployment drivers and orchestrators for solutions (e.g., TPC-RM, HACMP) can be easily derived from the PlannerStore using an extended CIM schema.

For example, the MOF of a Computer System (Server/Fiber Channel Switch/Storage Subsystem) is presented below:

```
Planner_ComputerSystem: CIM_ComputerSystem {
    uint16 ID;
    uint16 ActionCode;
};
``` wherein Planner_ComputerSystem class defines a Computer System that extends from CIM_ComputerSystem class, ID field denotes the ID associated with Aperi for an implementation, ActionCode defines if the instance was created/deleted/modified compared to the input PlannerStore. The class inherits all the properties (e.g., Identifying Descriptions, type, etc.) of the standard CIM_ComputerSystem class, as:

```
Class Planner_DataSource: CIM_ManagedElement {
    string Type;
    uint16 Size;
    uint8 ActionCode;
    Planner_DRProfile DRProfiles[ ];
    unit8 numberOfDRProfiles;
};
[Association]
class Planner_DataSourceSynchronized :
CIM_Synchronized {
    [Key]
    Planner_DataSource REF Antecedent;
    [Key]
    Planner_DataSource REF Dependent;
    string ID;
    Planner_DRProfile DRProfileId;
    uint8 copyType;
    uint8 replicaType;
    string techId;
    string Description
    uint8 ActionCode;
};
```

The key class of the input plan is the Planner_DataSource class on which a DRProfile (Disaster Recovery requirement) may be attached, whereas the output is represented using the Planner_DataSourceSynchronized association that is extended from CIM_Synchronized and represents the copy relationships. The fields copyType, replicaType and techId represent the replication technology used along with its configuration parameters (e.g., DS8000 flashcopy with incremental copy). The PlannerStore similarly contains classes and associations for other plan elements.

Planning and Optimization

The goal of the planning and optimization process is to find the most optimal solution for each data source (based on a user defined objective function). There are three primary steps for plan generation:

Match-making: Exploring the solution space for all the possible replication technologies that can be used to satisfy the DR requirements.

Populating and ranking: Involves capturing expert information in knowledge base, in terms of capabilities of replication technologies, interoperability constraints, and best practices for plan generation. Then, ranking the solutions for each data source based on the value of the objective function.

Bin-packing: Instantiating the selected replication technologies for each data source and bin-packing into the existing target resources.

Formalism for the Core Optimization

The DR optimization can be described as: Given a list of data sources [S1, S2, . . . , Sn], find a list of replication technologies [R1, R2, . . . , Rn], and a list of target copy-sets [T1, T2, . . . , Tn], such that the mapping Rn between (Sn, Tn) satisfies an administrator-defined DR Storage Service Class profile. This is now described in more detail based on the following terminology:

Replication Technology ($R_n$): Represents the attributes of a replication service,
typically defined in the knowledge base catalog tables. Each service has an attribute for a Replication Technology Class ($RC_n$) for that type of service (e.g., server-level, sync, async, PiT).

Best-practice Templates ($B_n$): Defines recipes for different DR profiles; it is
defined in terms of one or more Replication Technology Classes ($RC_1, \ldots, RC_n$).

Solution Branch ($SB_n$): Represents an intermediate data structure to store results of
the match-making. A Solution Branch comprises a set of one or more Replication
Technologies $\{R_1, \ldots, R_n\}$.

Match-Making

Figure 4:
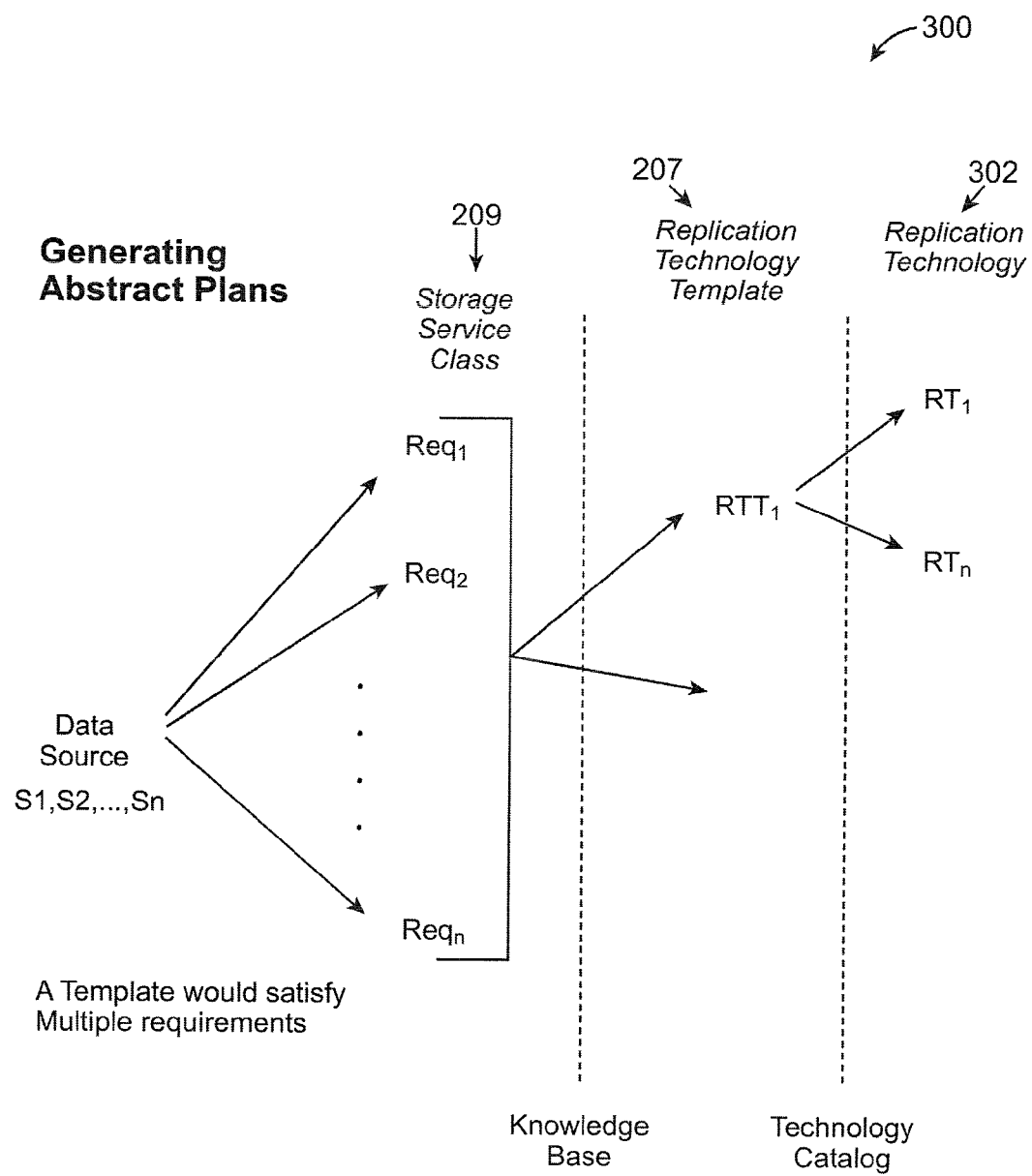
FIG. 4 shows an example of generating abstract DR plans using best practice policies, according to the invention.

As shown by example in FIG. 4, during a match-making process 300 (implemented by block 208 in FIG. 2), the DR profiles 206 for all the data sources S1, S2, . . . , Sn, are analyzed. For each DR profile 206, the possible replication technologies that can be used to satisfy the DR profile requirements are generated using: catalog tables 209 for supported DR Storage Classes providing DR requirements ($Req_1, \ldots, Req_n$), Best Practice Templates 207 providing replication technology templates ($RTT_1, \ldots,$) and Composition logic (composition of two or more technologies will behave in terms of their replication attributes). The output of the matchmaking phase is represented as a set of Solution Branches (SB) 302 $\{SB1, SB2, \ldots, SBn\}$. Each SB 302 including one or more replication technologies ($RT_1, \ldots, RT_n$). The operation of the Matchmaking process can be described using four broad cases:

1. The DR requirements of the application comprise a single DR Profile (e.g., virus protection only) that matches a template or technology in the Knowledgebase.
2. The DR requirements comprise more than one DR Profile that is satisfied by a single template or technology. Another variation is each DR Profile independently satisfied by the technology, in which case the solution is a combination of more than one technology.
3. Individual DR requirements (such as site-level protection) can be satisfied only using a combination of technologies.
4. One or more DR requirements do not match with any template or technology, resulting in the planning process raising an alert for human intervention.

For cases 1 and 2 above, the Matchmaking module instantiates results from solution templates and the catalog. For case 3, the Matchmaking is more involved; requiring calculation of DR properties of a composite technology, given the canonical models of individual technologies is nontrivial. DR Planner uses inductive composition logic to solve this problem. The problem of composition can be formally stated as: Given the canonical models of two technologies A and B, predict the ServiceClass and Resource for the composite technology of A and B. The composition can either be a sequence of A and B (A→B) where A is the primary copy of technology B, or A and B in parallel (A∥B) where the primary copy for technology A is also the primary copy of technology B. Approximating Resource for the composition is based on an additive function. Similarly, among the ServiceClass parameters, latency is additive, but RPO and RTO may require analysis for prediction because each requires understanding the protocol details for A and B. In the following, details of inductive composition logic to address this problem, are provided A simple representation of composition logic is to have formulas for all the possible technology combinations. For example, consider the composition of synchronous data replication using Metro Mirror (MM) with asynchronous long-distance Global Mirror (GM). As shown below, the formulas are derived by observing the recovery step including obtaining the target copy of GM online and making it accessible to clients.

$$RTO(MM \to GM) = RTO(GM) + \Delta$$

$$RPO(MM \to GM) = RPO(MM) + RPO(GM)$$

Hence, the recovery time equals RTO(GM) and a $\Delta$, where $\Delta$ captures the time it takes for changing the routing table. Similarly, the formula for RPO is based on the observation that data staleness gets added along the sequence. In inductive composition logic, formulas are defined on categories of replication technologies and framed in an inductive manner where point B (or single copy) replication technology is attached either in sequence or in parallel with a composite replication technology A. The technology categories are similar to those for Functionality templates. The formulas given to DR Planner are configurable and based on a detailed study of the replication technologies.

Ranking

Figure 5:
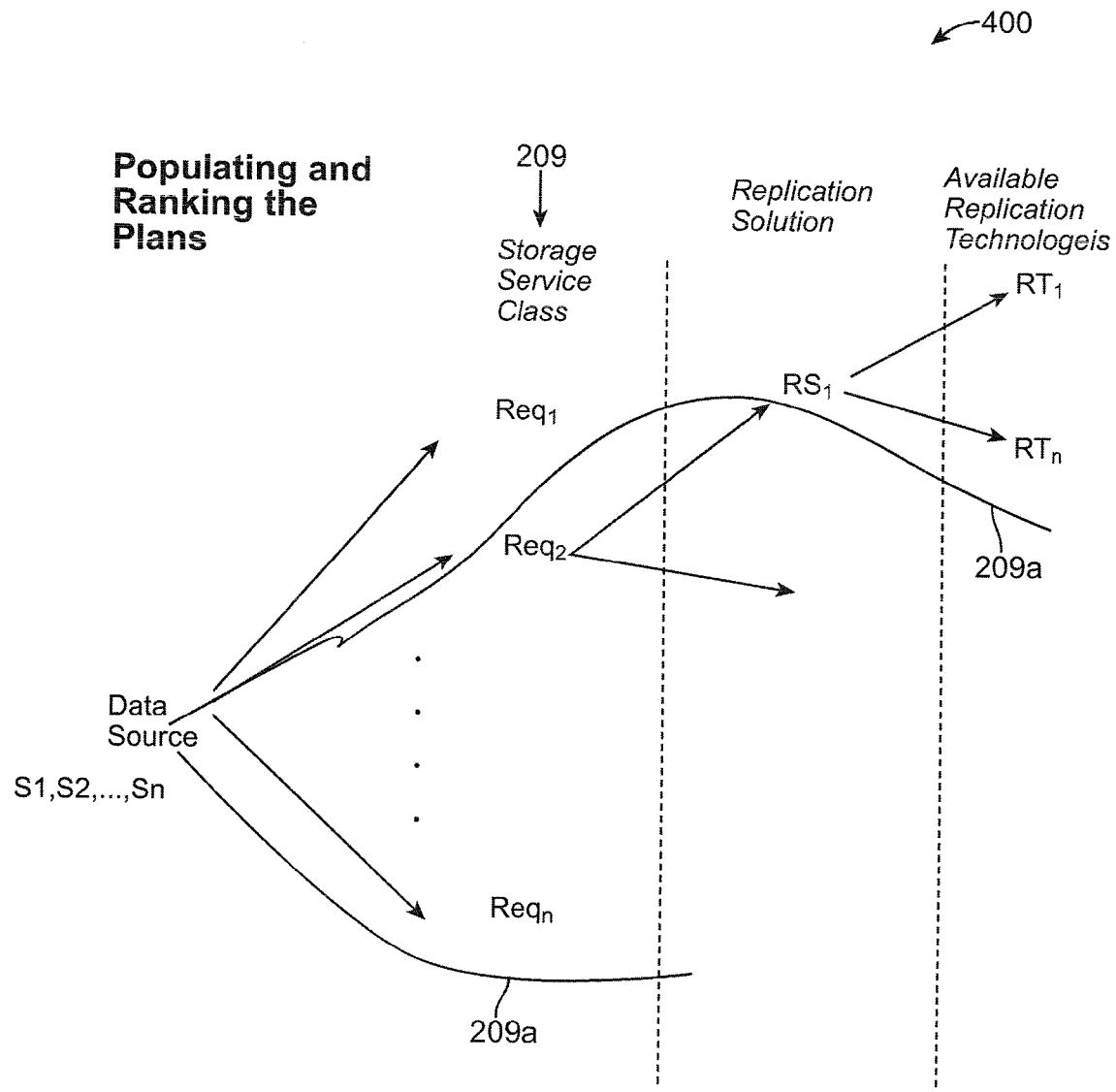
FIG. 5 shows an example of populating the DR plans with available replication technologies and ranking them, according to the invention.

As shown by example in FIG. 5, during a ranking process 400 (implemented by blocks 210 and 212 in FIG. 2, for each data source, the Solution Branches $\{SB1, SB2, \ldots, SBn\}$ are ranked based on the objective function specified by the administrator. Each solution branch is referred to as the Replication Solution. The objective function may be specified as a preference in the DR profile 206. Example objective functions may include: minimize RPO, maximize homogeneity of technologies, minimize cost, etc. For each data source, the output is a ranked set of Replication Solutions $RS_1 \ldots RS_n$. Not all RS can be instantiated within the IT computing system, it is limited the available replication technology licenses and interoperability constraints. Thus, the highest ranked RS may not be instantiated or there may be more than one way to instantiate the RS since the same functionality may be available at more than one level. For example, for an RS of Snapshot, the functionality may be available at the VM-level (using VMWare Snapshot), or at the Database level or at the storage controller level (using flashcopy or equivalent). Based on the available technologies, the ranking process appropriately selects the highest ranked solution (as shown in the FIG. 5 as graphs 209a).

Bin Packing

Figure 6:
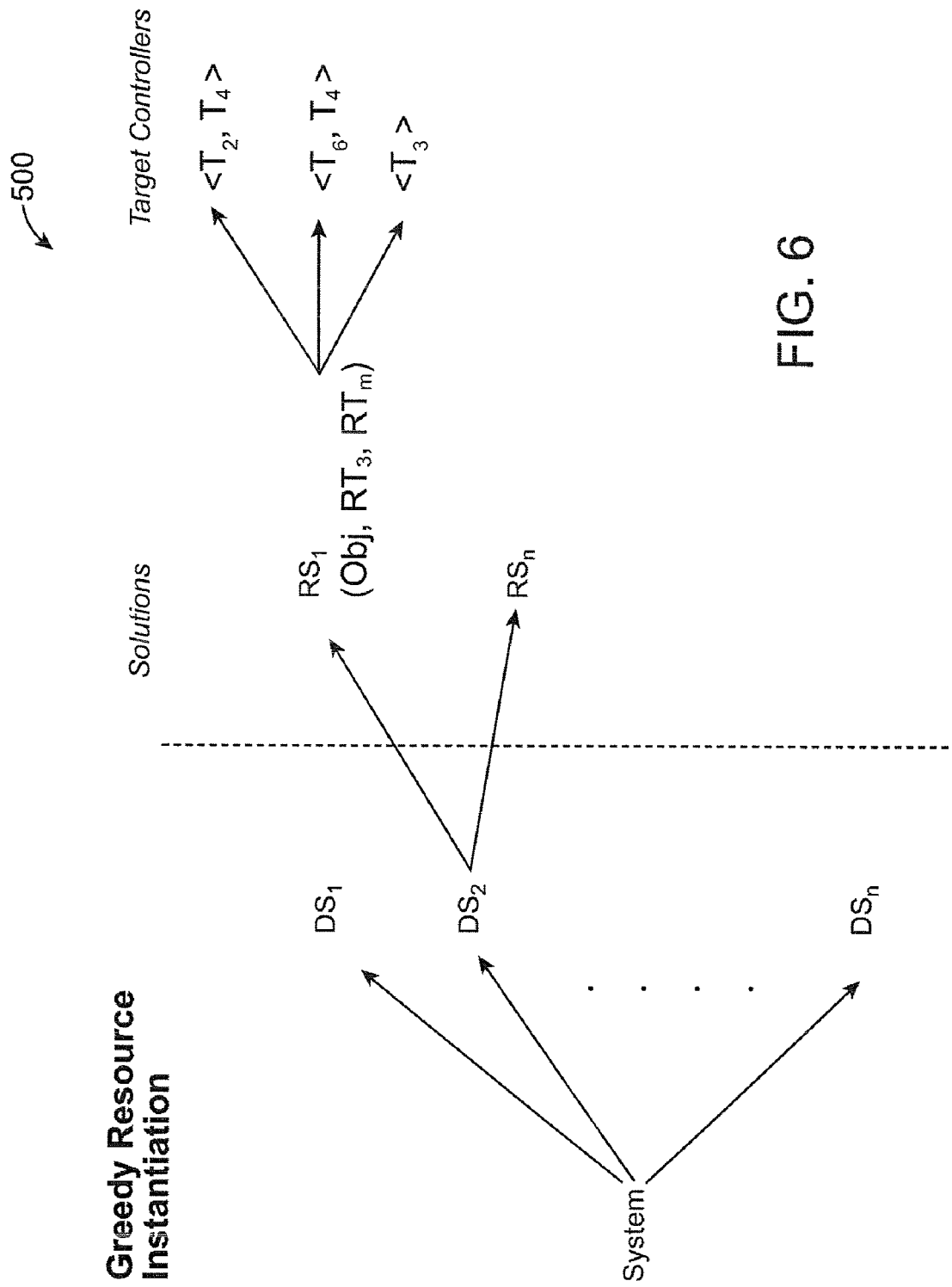
FIG. 6 shows an example of allocating resources to DR plans for each data source, according to the invention.

As shown by example in FIG. 6, during a greedy resource allocation process 500 (implemented by block 214 in FIG. 2), a greedy resource instantiation strategy is performed for a System consisting of one or more $\{DS_1, \ldots, DS_n\}$. For each data-source, the set of available Replication Solutions is represented as $\{RS_1(Obj, RT_3, RT_m), \ldots\}$ where each element in the set is interpreted as: Replication Solution $RS_1$ consists of Replication Technologies $RT_3$ and $RT_m$ with Obj being the variable representing the rank of the solution (based on the user specified objective parameter such as cost, homogeneity, etc.). For each solution, the list of target controllers or devices T is shown as a set $\{<T_2, T_4>, <T_6, T_4>, <T_3>\}$ where each element consists of one or more devices that can be used to instantiate the solution.

For each data source, the following steps are performed: (i) rank candidate Solution Branches and select the highest rank Solution Branch as described in the previous step, (ii) instantiate the selected Solution Branch by checking the available resources (e.g., server, storage and network), (iii) scan the catalog tables 209 in the knowledge base to check for interoperability constraints, (iv) if all constraints (as described in the earlier steps) are met, reserve the required capacity and bandwidth requirements from the available resources for the selected Solution Branch, (v) however, if all the constraints are not met, then select the next Solution Branch and repeat steps (ii)-(iv). Repeat the above steps for the next data source. If none of the Solution Branches can be instantiated, return no feasible solution.

The above bin-packing process provides a framework that can be used to implement all objective functions. A heuristic implementation of the most common optimization objective may also be utilized using homogeneity metric. Based on the homogeneity metric, those plans are preferred that use fewer different replication technologies, thus making their management simpler. A greedy heuristic process may be used to determine the most homogenous plans, as follows. For set of data sources and their candidate Solution Branches, label all the data sources as un-finalized. While there exist un-finalized data sources, selected a replication technology R that features most often in the candidate Solutions Branches of un-finalized data sources. Select a replication technology R and finalize all the data sources with a candidate Branch Solution that uses the selected replication technology R. The process iterates until no such un-finalized data sources exist. It is noted that if there are N data sources, then the process terminates in no more than N iterations, since it finalizes at least one data source in each iteration. Further, if the replication technologies are structured as a heap ordered by the number of occurrences in the set of candidate Solution Branches, then each iteration require a time O (log M) where M is the number of eligible candidate replication technologies. Hence, the process has a running time that is linear in the number of data sources and logarithmic in the number of replication technologies, making it very efficient.

In contrast to individual tier planners, an integrated planner according to the invention analyzes tradeoffs between overlapping protocols at different tiers. For example, synchronous replication at the storage level may be replaced by database-level synchronous replication which provides the benefit of transaction integrity at the expense of overhead to the network bandwidth, application impact, and possible distance limitations. Additionally, integrated planners explore combinations of technologies across tiers for real-world deployments of DR. Even within a particular tier, the invention differentiates between similar replication protocol provided by different vendors, since they exhibit different properties for resource usage and DR. The integrated DR process has the following features:

Canonical representation of technologies—Automation is a representation of technologies at different tiers, capturing interoperability requirements, resource usage, DR properties, and operational details.

Composition of replication technologies—Given the properties of individual technologies, predicting how the composition of two or more technologies will behave in terms of their replication attributes.

Complex optimization—Finding optimized DR plans that can be deployed within the infrastructure.

Orchestration of technologies for data synchronization and failure recovery—Most replication technologies are available with in-built scripts and application programming interface (API) for periodic data synchronization and failure recovery. An example DR plan with technologies for Virtual Machine snapshots, with synchronous intrasite database replication, and asynchronous intersite storage replication needs to be orchestrated during site failure recovery with the storage reconstruction followed by virtual machine restart followed by the database restart. Since the technologies by themselves are not aware of their dependencies, an external framework is used to orchestrate the activities after deployment.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for automated disaster recovery (DR) planning in an information technology computing environment including virtual machines, servers, interconnecting switches, storage systems, comprising:

discovering servers, networks, and storage devices in the computing environment;

capturing best practices in planning, and capabilities, interoperability, limitation and boundary values for different DR technologies;

determining multiple DR plans as combinations of one or more replication technologies that can be used to satisfy DR requirements; and assessing a feasible DR plan from said multiple DR plans, to deploy for DR planning of a primary computing environment.

2. The method of claim 1, further comprising performing a multi-level optimization process based on a combination of analytic models and best-practice heuristics for deriving an integrated server-storage DR plan, wherein the optimization takes into account one or more of: DR requirements specified by a user, existing IT infrastructure in terms of hardware and software, available licenses, utilization statistics, number of sites and objective functions specified by the user.

3. The method of claim 2, wherein the multi-level optimization process is performed at multiple levels including one or more of: a storage system, a database and a virtual machine.

4. The method of claim 2, further comprising generating discrete parameter groups for sequential multi-level optimization.

5. The method of claim 2, further comprising generating multiple DR plans based on different user-defined objective functions.

6. The method of claim 2, further comprising utilizing non-linear and non-differentiable cost functions.

7. The method of claim 2, further comprising utilizing best practice information of deployed DR plans.

8. The method of claim 2, further comprising utilizing replication technology attributes as well as hardware and software constraints.

9. The method of claim 2 further including deploying the DR plan for replicating information from the primary computing environment to a secondary computing environment based on the DR plan.

10. An automated disaster recovery (DR) planning apparatus for an information technology computing environment including virtual machines, servers, interconnecting switches, storage systems, comprising:
- a discovery module configured for discovering servers, networks, and storage devices in the computing environment;
- an expert knowledge base module configured for capturing best practices in planning, and capabilities, interoperability, limitation and boundary values for different DR technologies;
- a match-making module configured for determining multiple DR plans as combinations of one or more replication technologies that can be used to satisfy DR requirements; and
- an optimizer configured for assessing a feasible DR plan from said multiple DR plans, to deploy for DR planning of a primary computing environment.

11. The system of claim 10, wherein the optimizer is configured for performing a hybrid heuristic-analytic optimization process for integrated server-network-storage DR planning 12. The system of claim 10, wherein the optimizer is configured for performing a multi-level hybrid heuristic-analytic optimization process based on a combination of analytic models and best-practice heuristics for deriving an integrated server-storage DR plan.

13. The system of claim 10, wherein the match-making module is further configured for determining DR plans based on best-practice templates and composition of replication technologies.

14. The method of claim 10, wherein the optimizer is further assessing a feasible DR plan based on one or more of: (1) said multiple DR plans for one or more enterprise applications, (2) tolerable time latency and data loss, (3) and resource usage properties of each DR plan, (4) available resources, and (5) administrator-defined priorities and objective metrics including one or more of cost, application latency impact, and homogeneity of replication technologies.

15. The apparatus of claim 10, wherein the optimizer is further configured for generating discrete parameter groups for sequential multi-level optimization.

16. The apparatus of claim 10, wherein the match-making module is further configured for generating multiple DR plans based on different user-defined objective functions.

17. The apparatus of claim 10, wherein the optimizer is further configured for utilizing non-linear and non-differentiable cost functions, for assessing a feasible DR plan.

18. The apparatus of claim 10, wherein the knowledge base is further configured for capturing best practice information of deployed DR plans.

19. The apparatus of claim 12, wherein the optimizer is further configured for utilizing replication technology attributes as well as hardware and software constraints.

20. A disaster recovery (DR) planning system, comprising:
- a primary computing site; and
- a disaster recovery (DR) planning apparatus, comprising:
    - a discovery module configured for discovering servers, networks, and storage devices in a computing environment;
    - an expert knowledge base module configured for capturing best practices in planning, and capabilities, interoperability, limitation and boundary values for different DR technologies;
    - a match-making module configured for determining multiple DR plans as combinations of one or more replication technologies that can be used to satisfy DR requirements; and
    - an optimizer configured for assessing a feasible DR plan from said multiple DR plans, to deploy for DR planning of the primary computing site.

* * * * *